United States Patent
Carr et al.

(10) Patent No.: US 6,230,476 B1
(45) Date of Patent: May 15, 2001

(54) ROW CROP GATHERING BELT FOR COMBINE HEADS

(75) Inventors: Brian W. Carr, Nevada; Donald F. Handorf, Ames; Nick Merfeld, Nevada; Ryan D. Jensen, Huxley; Scott A. Sporrer, Nevada, all of IA (US)

(73) Assignee: Gary W. Clem, Inc., Nevada, IA (US)

( * ) Notice: Subject to any disclaimer, the term of this patent is extended or adjusted under 35 U.S.C. 154(b) by 0 days.

(21) Appl. No.: 09/389,763

(22) Filed: Sep. 2, 1999

(51) Int. Cl.⁷ .................................................. A01D 34/00
(52) U.S. Cl. ..................... 56/14.3; 56/98; 56/94
(58) Field of Search ............................ 56/119, 14.3, 500, 56/94, 66, 59, 75, 78, 82, 88, 93, 98, 111, 118, 106, 69; 198/844.1

(56) References Cited

U.S. PATENT DOCUMENTS

| | | | |
|---|---|---|---|
| 3,803,820 | * | 4/1974 | Knapp ...................... 56/98 |
| 3,858,384 | * | 1/1975 | Maiste et al. ............ 56/14.2 |
| 3,930,354 | * | 1/1976 | Borderie .................... 56/94 |
| 4,266,394 | * | 5/1981 | Van Ginhoven et al. ........ 56/94 |
| 5,428,946 | * | 7/1995 | Hansen et al. ........... 56/27.5 |
| 5,485,716 | * | 1/1996 | Baker ...................... 56/14.3 |
| 5,878,561 | * | 3/1999 | Gunn ......................... 56/98 |

* cited by examiner

*Primary Examiner*—Thomas B. Will
*Assistant Examiner*—Arpad Fabian Kovacs
(74) *Attorney, Agent, or Firm*—Zarley, McKee, Thomte, Voorhees & Sease

(57) ABSTRACT

A combine gathering belt assembly has a pair of continuous sprocket chains each supported on rotatable sprockets at their opposite ends, and having spaced parallel inner traveling chain portions. A plurality of flexible spaced belt segments are secured to the sprocket chains. The belt segments on one chain are staggered with respect to the belt segments on the other chain. Each belt segment has a base end adjacent the chain to which it is attached, and an outer end extending forwardly while between the spaced parallel inner traveling chain portions. The belt segments are of such size and spacing that an outer end of a belt segment on one chain closes on a base end of a belt segment on the opposite chain while in the spaced parallel inner traveling chain portions. The closed belt segments then open up as they move around the rotatable sprockets on one discharge end of chains to release plant segments that may be bound by opposite belt segments while moving through the spaced parallel inner chain portions.

7 Claims, 3 Drawing Sheets

ROW CROP GATHERING BELT FOR COMBINE HEADS

BACKGROUND OF THE INVENTION

Combine heads for row crops conventionally have two pointed elongated gathering frames which are closely spaced to form an elongated slot to receive the plants of a row crop with the gathering frames being located on opposite sides of the row crop. As the combine moves forwardly, a pair of continuous rotating belts mounted within the gathering frames in a sinusoidal configuration rotate rearwardly within the slot in overlapping synchronized relation. The stalks of soybeans, for example, are gripped by the overlapping undulations of the belts and pulled rearwardly through the slots for disposal.

The main problem associated with this type of design is that the belts trap plants therebetween and sometimes pull them around at the discharge end of the slots instead of releasing them. In combines especially built to harvest seed stock, this leads to the possibility of contamination from plot to plot. This is because the seed from the different plots is segregated, and a rogue soybean stalk not released by the gathering belts, may contaminate the seed from a second plot if present on the belt as a row in the second plot is being harvested.

It is therefore a principal object of this invention to provide a combine head gathering belt assembly that will not allow plants to become bound between the belts when the belts move around upper sprockets supporting the chain mounted belts.

A further object of this invention is to provide a combine head gathering belt assembly that will release the plants as the belts move past the upper sprockets of the combine head in which the belts are mounted.

These and other objects will be apparent to those skilled in the art.

SUMMARY OF THE INVENTION

A combine head gathering belt assembly has a pair of continuous sprocket chains each supported on rotatable sprockets at their opposite ends, and having spaced parallel inner traveling chain portions. A plurality of flexible spaced belt segments are secured to the sprocket chains. The belt segments on one chain are staggered with respect to the belt segments on the other chain. Each belt segment has a base end adjacent the chain to which it is attached, and an outer end extending forwardly while between the spaced parallel inner traveling chain portions. The belt segments are of such size and spacing that an outer end of a belt segment on one chain closes on a base end of a belt segment on the opposite chain while in the spaced parallel inner traveling chain portions. The closed belt segments then open up as they move around the rotatable sprockets on one discharge end of chains to release plant segments that may be bound by opposite belt segments while moving through the spaced parallel inner chain portions.

DESCRIPTION OF THE PREFERRED EMBODIMENT

Figure 1:
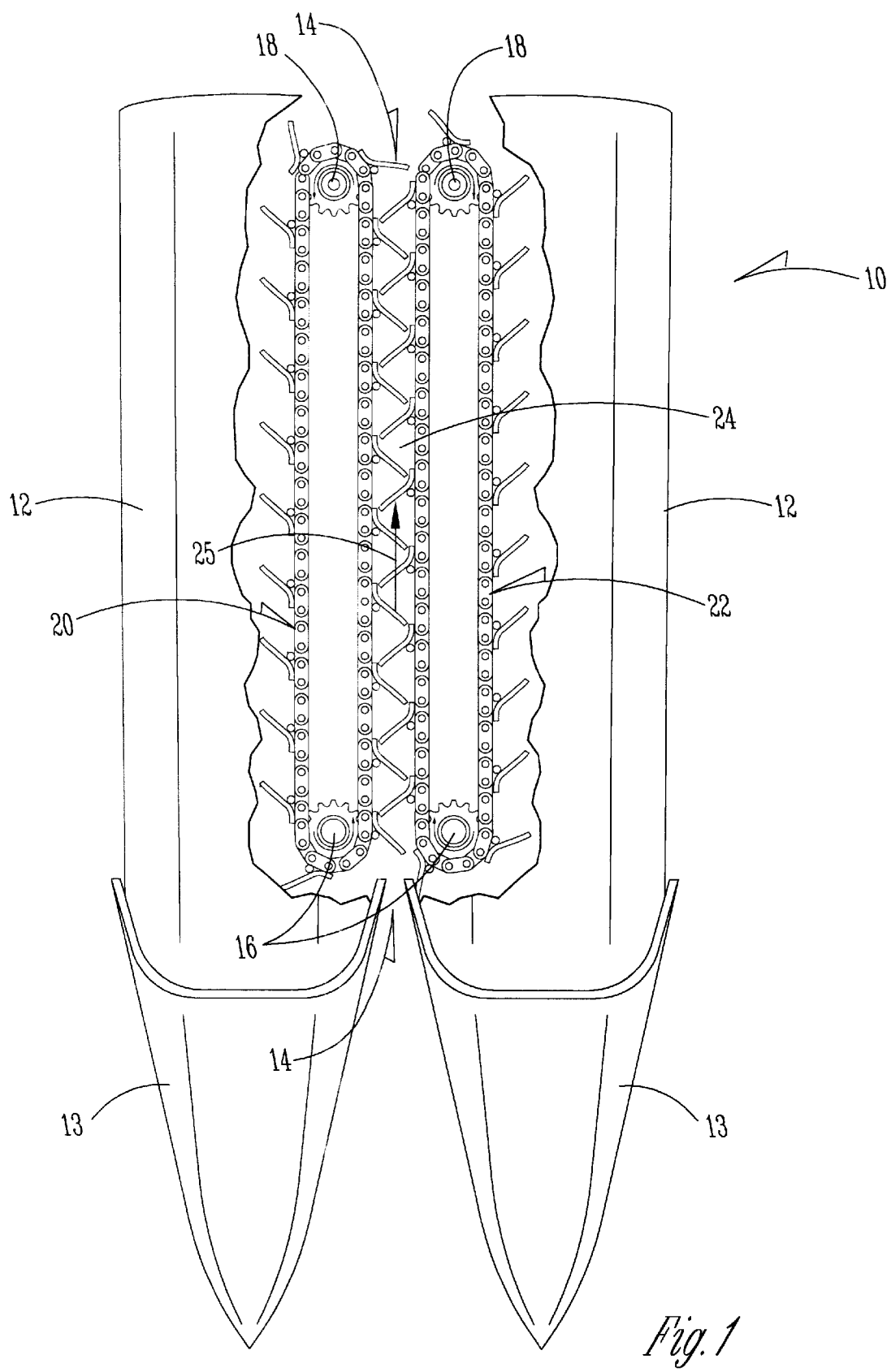
FIG. 1 is a schematic plan view of a portion of a combine head showing the sprocket chains to which the belt segments of this invention are attached.

With reference to FIG. 1, the numeral 10 designates the combine head gathering belt of this assembly positioned within a pair of gathering frames 12 which are generally parallel to each other and which have pointed forward ends 13 thereon. An elongated slot 14 represents the space between the gathering frames 12. A pair of spaced forward sprockets 16 are mounted on each of the frames 12 and a rearward pair of sprockets 18 are similarly secured to the frames. A first continuous sprocket chain 20 extends around the sprockets 16 and 18 on the left hand gathering frame 12 shown in FIG. 1; and a second continuous sprocket chain 22 extends around sprockets 16 and 18 on the right hand gathering frame 12 shown in FIG. 1. The numeral 24 designates the inner traveling course of the two chains 20 and 22 in slot 14. The arrow 25 indicates the direction of movement of the chains 20 and 22 as they move within slot 14. Sprockets 18 are powered by any conventional structure (not shown). As shown in FIG. 1, the sprockets 16 and 18 are so positioned that the chains 20 and 22 have identical parallel elongated configurations of the same width and length.

Figure 2:
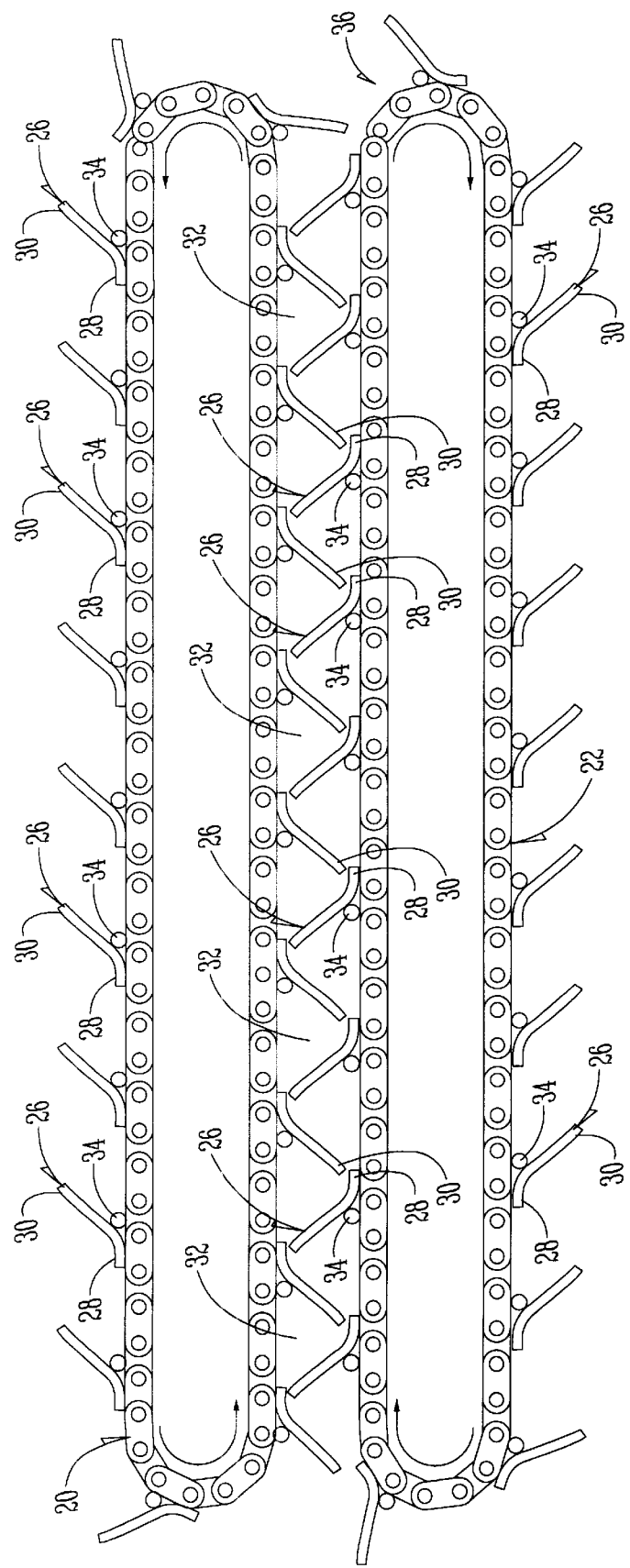
FIG. 2 is an enlarged scale plan view of the sprocket chains of this invention with the gathering belts attached thereto.

As generally shown in FIG. 2, a plurality of belt segments 26 having a base end 28 and a free end 30 which extends diagonally outwardly from the chains 20 and 22 are secured to each of the chains in spaced condition. Within the slot 14, the free ends 30 of the belt segments move to a position adjacent the base ends 28 of the belt segments on the opposite strand of chain to create a closed enclosure 32. It is within these closures 32 that the belt segments grasp the plants to pull them through the slot 14. The free ends 30 of the belt segments are held outwardly from the chains by rods 34 which will be discussed hereafter. The enclosures 32 become open as designated by the numeral 36 and as best seen at the right hand end of FIG. 2 when the belt segments within slot 14 start to move around the sprockets 18. It is this opening 36 that releases the plants or stalks from enclosures 32 and prevents the enclosed stalks from attaching themselves to the sprocket chains via belt segments to continue to move around the sprockets 18 for a return trip through slot 14.

Figure 3:
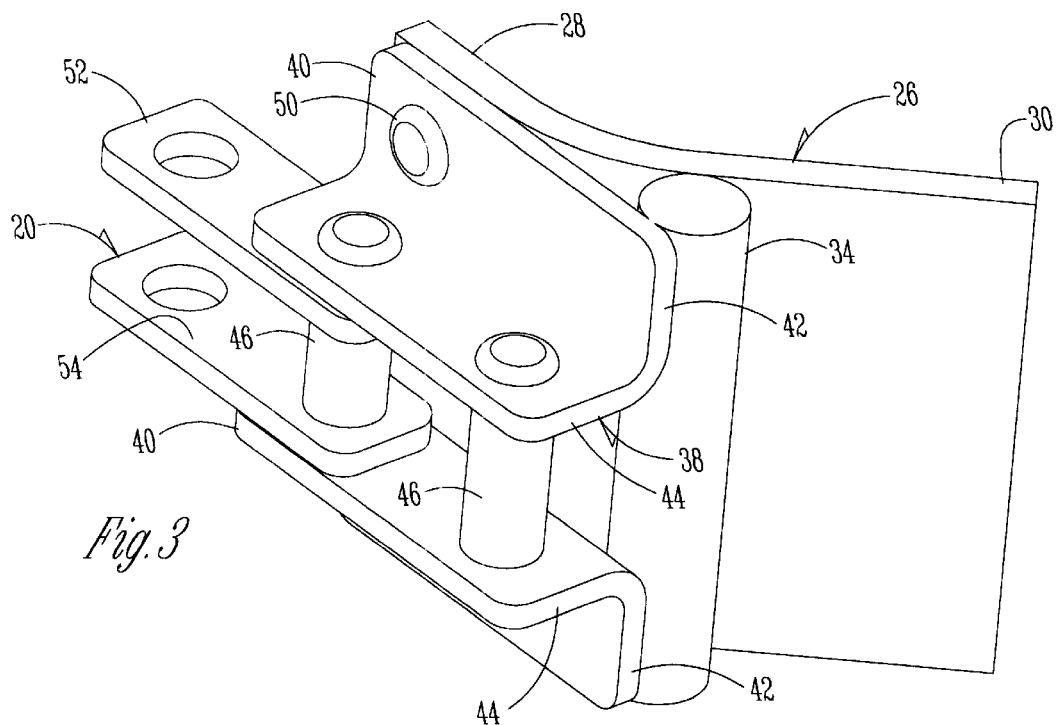
FIG. 3 is an enlarged scale perspective view of one side of an attachment link for securing the belt segments to the sprocket chain.
Figure 4:
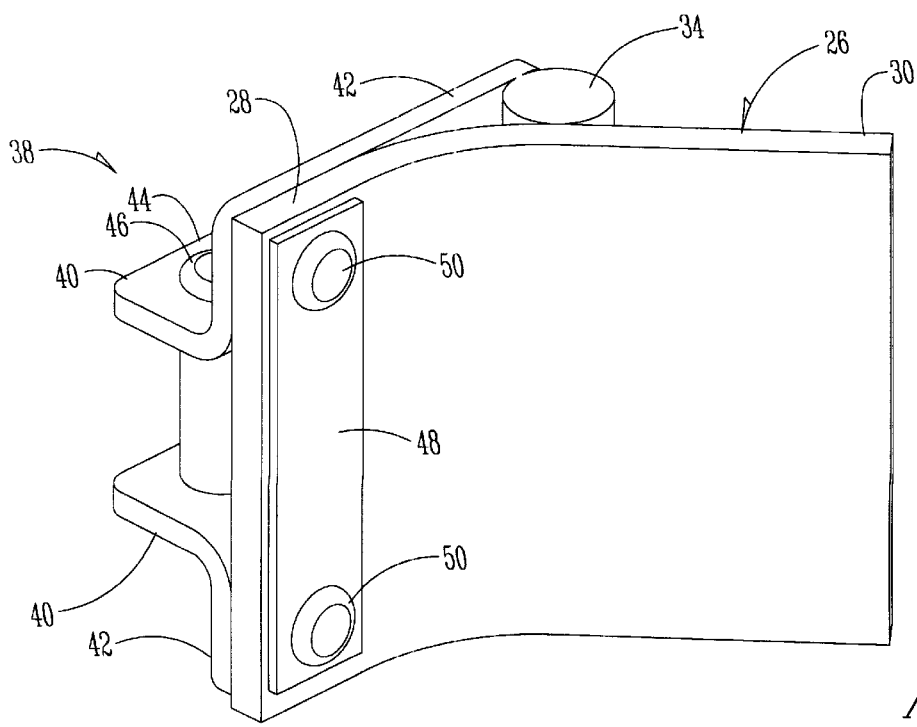
FIG. 4 is an enlarged scale perspective view similar to that of FIG. 4 that shows the side of the attachment link as viewed from the rearward side of FIG. 3.

With reference to FIGS. 3 and 4, an attachment link 38 is used to secure the belt segments 26 to the sprocket chains 20 and 22. The attachment links 38 are comprised of a pair of angle elements 40 which have a vertical flange 42 and a horizontal flange 44. A pair of chain rollers 46 extend through registering apertures in flanges 44. The rods 34 are welded to the flanges 42 of angle element 40 opposite to flange 44. A pair of apertures (not shown) are formed in flange 42 to register with apertures (not shown) in the base 28 of belt segment 26 which is held to flanges 42 by means of backing strip 48 and rivets 50 (FIGS. 3 and 4). Bolt segment 26 engages rod 34 and is bent outwardly from flange 42 by the rod.

Sprocket chain 20 (and sprocket chain 22) are comprised of upper chain links 52 and lower chain links 54, which are compatible in size and shape to flanges 44 on links 38.

As described above, the rotation of the sprocket chains 20 and 22 is shown by the arrow 25 in FIG. 1 as well as the arrows in FIG. 2. The harvested plants are received in the end of slot 14 adjacent sprockets 16 and in between the pointed ends 13 of the gathering frames 12. The enclosures 32 are formed by the free ends 30 of the belt increments on one chain moving adjacent the base ends 28 of the adjacent chain portion to create the enclosures 32 which grasp and move the plant segments. When the enclosures 32 approach the end of the sprocket chains 20 and 22 adjacent the sprockets 18, the opening 36 is created as the belt segments separate from each other, thus freeing the plant segments. The belt segments also tend to provide a force to the departing plants as their centrifugal speed increases as they extend around sprockets 18.

This invention is particularly adapted for use with soybean crops or the like.

It is therefore seen that the gathering belt assembly of this invention will decrease if not eliminate the likelihood that harvested plants will continue to move around the gathering belts for possible contamination of subsequently harvested plots.

What is claimed is:

1. A combine head gathering belt assembly for combines, comprising, first and second elongated support guide frames positioned side by side having opposite sides, and an elongated slot therebetween, first and second laterally spaced sprockets rotatably mounted on a first end of each guide frame, third and fourth laterally spaced sprockets rotatably mounted on a second end of each guide frame, a first continuous sprocket chain encircling the first and third sprockets and having an inner longitudinal traveling course in the elongated slot, a second continuous sprocket chain encircling the second and fourth sprockets and having an inner longitudinal traveling course within the slot parallel to the travel source of the second continuous sprocket chain, the first and second laterally spaced sprockets and the third and fourth laterally spaced sprockets being positioned so that the first and second continuous sprocket chains have identical parallel elongated configurations of the same width and length.

a plurality of flexible spaced belt segments secured to the sprocket chains and extending outwardly and forwardly from the chains on the inner travel courses thereof;

each belt segment having a base end adjacent the chain to which it is attached, and an outer free end, and being positioned on the chains and being of a length that the outer free ends of segments on one chain terminate adjacent the base ends of segments on the other chain when in the elongated slot, and whereupon such outer frame and base ends will separate from each other to create an opening therebetween when moving around the sprockets upon which the chains are mounted so as to release any plant stalks that may be captured by and between adjacent belt segments while traveling the inner travel course in the elongated slot.

2. The device of claim 1 wherein the orientation of the belt segments is determined by attachment links which are secured to the sprocket chains in spaced relation to each other, each attachment link being connected to links in the chain and including a belt segment secured to the link, and a stiffener rod secured to the link whereupon the stiffener rod forces the free end of the belt segment to assume a position outwardly away from the link.

3. The device of claim 2 wherein the links on the chains are in staggered positions on each of the chains as they move through the elongated slot.

4. The device of claim 3 wherein compartments are formed between belt segments while the belt segments are moving through the elongated slot, and wherein the compartments become open when the chains reach a discharge end of the slot whereupon any plant stalk in the compartment is released.

5. A combine head gathering belt assembly for combines, comprising, first and second elongated support guide frames positioned side by side having opposite sides, and an elongated slot therebetween, first and second laterally spaced sprockets rotatably mounted on a first end of each guide frame, third and fourth laterally spaced sprockets rotatably mounted on a second end of each guide frame, a first continuous sprocket chain encircling the first and third sprockets and having an inner longitudinal traveling course in the elongated slot, a second continuous sprocket chain encircling the second and fourth sprockets and having an inner longitudinal traveling course within the slot parallel to the travel source of the second continuous sprocket chain, a plurality of flexible spaced belt segments secured to the sprocket chains and extending outwardly and forwardly from the chains on the inner travel courses thereof;

each belt segment having a base end adjacent the chain to which it is attached, and an outer free end, and being positioned on the chains and being of a length that the outer free ends of segments on one chain terminate adjacent the base ends of segments on the other chain when in the elongated slot, and whereupon such outer frame and base ends will separate from each other to create an opening therebetween when moving around the sprockets upon which the chains are mounted so as to release any plant stalks that may be captured by and between adjacent belt segments while traveling the inner travel course in the elongated slot, the orientation of the belt segments is determined by attachment links which are secured to the sprocket chains in spaced relation to each other, each attachment link being connected to links in the chain and including a belt segment secured to the link, and a stiffener rod secured to the link whereupon the stiffener rod forces the free end of the belt segment to assume a position outwardly away from the link.

6. The device of claim 5 wherein the links on the chains are in staggered positions on each of the chains as they move through the elongated slot.

7. The device of claim 6 wherein compartments are formed between belt segments while the belt segments are moving through the elongated slot, and wherein the compartments become open when the chains reach a discharge end of the slot whereupon any plant stalk in the compartment is released.

* * * * *